United States Patent
Conaty

(12) 
(10) Patent No.: US 11,646,133 B1
(45) Date of Patent: *May 9, 2023

(54) CABLE FOR POWER-OVER-ETHERNET HAVING AN EXTENDED USABLE LENGTH

(71) Applicant: Paige Electric Company, LP, Union, NJ (US)

(72) Inventor: Francis X. Conaty, Chester, NJ (US)

(73) Assignee: Paige Electric Company, LP, Union, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/150,537

(22) Filed: Jan. 5, 2023

Related U.S. Application Data

(63) Continuation of application No. 17/385,225, filed on Jul. 26, 2021, now Pat. No. 11,562,835, which is a continuation of application No. 16/653,271, filed on Oct. 15, 2019, now Pat. No. 11,107,605, which is a continuation of application No. 15/080,936, filed on Mar. 25, 2016, now Pat. No. 10,453,589.

(60) Provisional application No. 62/138,575, filed on Mar. 26, 2015.

(51) Int. Cl.
    *H01B 11/02* (2006.01)
    *H01B 13/00* (2006.01)
    *H04L 12/10* (2006.01)

(52) U.S. Cl.
    CPC ......... *H01B 11/02* (2013.01); *H01B 13/0036* (2013.01); *H04L 12/10* (2013.01)

(58) Field of Classification Search
    CPC ..... H01B 11/02; H01B 13/0036; H01R 24/64
    See application file for complete search history.

(56) References Cited

U.S. PATENT DOCUMENTS

| | | | |
|---|---|---|---|
| 5,003,579 A | 3/1991 | Jones | |
| 5,424,491 A | 6/1995 | Walling et al. | |
| 5,952,607 A | 9/1999 | Friesen et al. | |
| 6,211,467 B1 | 4/2001 | Berelsman et al. | |
| 6,378,283 B1 * | 4/2002 | Barton | H01B 13/0292 59/64 |
| 7,015,397 B2 | 3/2006 | Clark | |
| 7,375,284 B2 | 5/2008 | Stutzman et al. | |
| 7,751,442 B2 | 7/2010 | Chang et al. | |
| 7,873,057 B2 | 1/2011 | Robitaille et al. | |
| 8,045,565 B1 * | 10/2011 | Schurig | H02G 9/04 333/160 |
| 8,280,942 B2 | 10/2012 | Caveney | |
| 8,401,387 B2 | 3/2013 | Biegert et al. | |
| 8,705,341 B2 | 4/2014 | Robitaille et al. | |

(Continued)

OTHER PUBLICATIONS

"GenSPEED 6 Category 6 [22 AWG] Cable", circa 2016, (2 Pages), General Cable Technologies Corporation.

(Continued)

*Primary Examiner* — Sherman Ng
(74) *Attorney, Agent, or Firm* — Fredrikson & Byron, P.A.

(57) ABSTRACT

A method of extending the usable length of a power-over-ethernet cable includes the steps of providing twisted pairs of wires with the conductor of each wire being a 20 AWG or 22 AWG conductor and terminating the cable at an RJ-45 style connector. The connector for the 20 AWG conductors has an insert therein with holes that can accommodate 20 AWG conductors. FEP, PVC or PP insulation may surround each conductor.

27 Claims, 3 Drawing Sheets

(56) References Cited

U.S. PATENT DOCUMENTS

| | | | |
|---|---|---|---|
| 9,251,930 B1* | 2/2016 | McNutt | H01B 11/002 |
| 2002/0071644 A1 | 6/2002 | Nakajima | |
| 2002/0180592 A1* | 12/2002 | Gromov | H04B 3/548 |
| | | | 370/200 |
| 2003/0047342 A1 | 3/2003 | Rotta et al. | |
| 2005/0092514 A1 | 5/2005 | Kenny et al. | |
| 2005/0248653 A1* | 11/2005 | Hoang | H04N 23/66 |
| | | | 348/E7.051 |
| 2006/0251179 A1* | 11/2006 | Ghoshal | H04L 25/0266 |
| | | | 375/257 |
| 2007/0041568 A1* | 2/2007 | Ghoshal | H04L 12/10 |
| | | | 379/324 |
| 2007/0163800 A1 | 7/2007 | Clark et al. | |
| 2009/0245120 A1* | 10/2009 | Jones | H04L 12/413 |
| | | | 370/252 |
| 2010/0107207 A1* | 4/2010 | Nogier | H04N 7/108 |
| | | | 348/790 |
| 2011/0266052 A1 | 11/2011 | Glew | |
| 2014/0262413 A1 | 9/2014 | Mccleary et al. | |
| 2014/0267746 A1 | 9/2014 | Hertrich et al. | |

OTHER PUBLICATIONS

Tek-Tips forum webpage for "Can You Use Cat6 RJ45 Connectors With 22AWG Wire?", circa Jun. 2009, (3 Pages), accessible at https:www.tek-tips.comviewthread.cfm?qid=1551872.
2006 Belden Master Catalog, circa 2006, (824 pages).

* cited by examiner

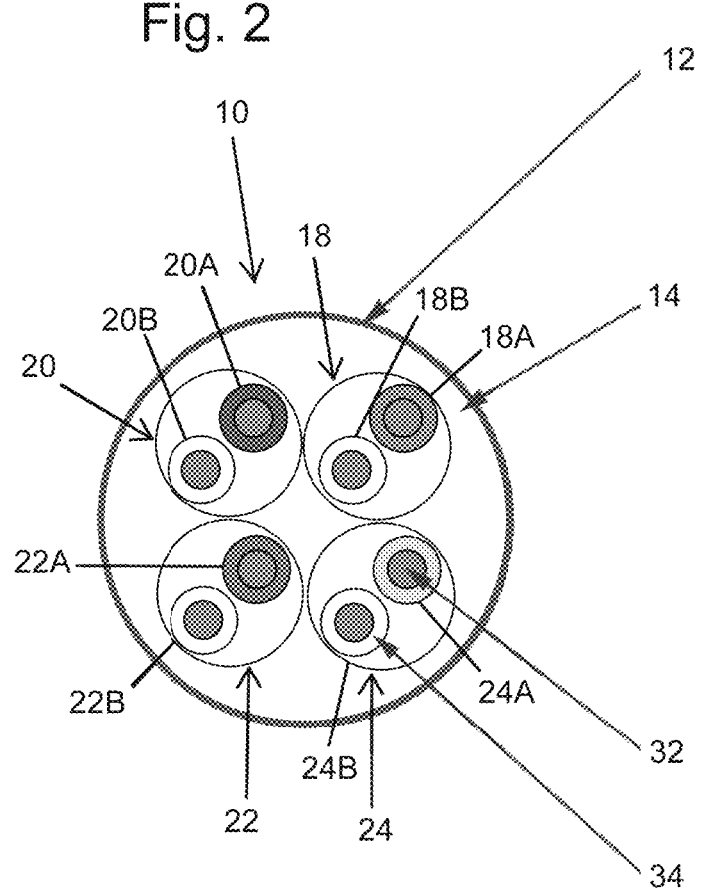

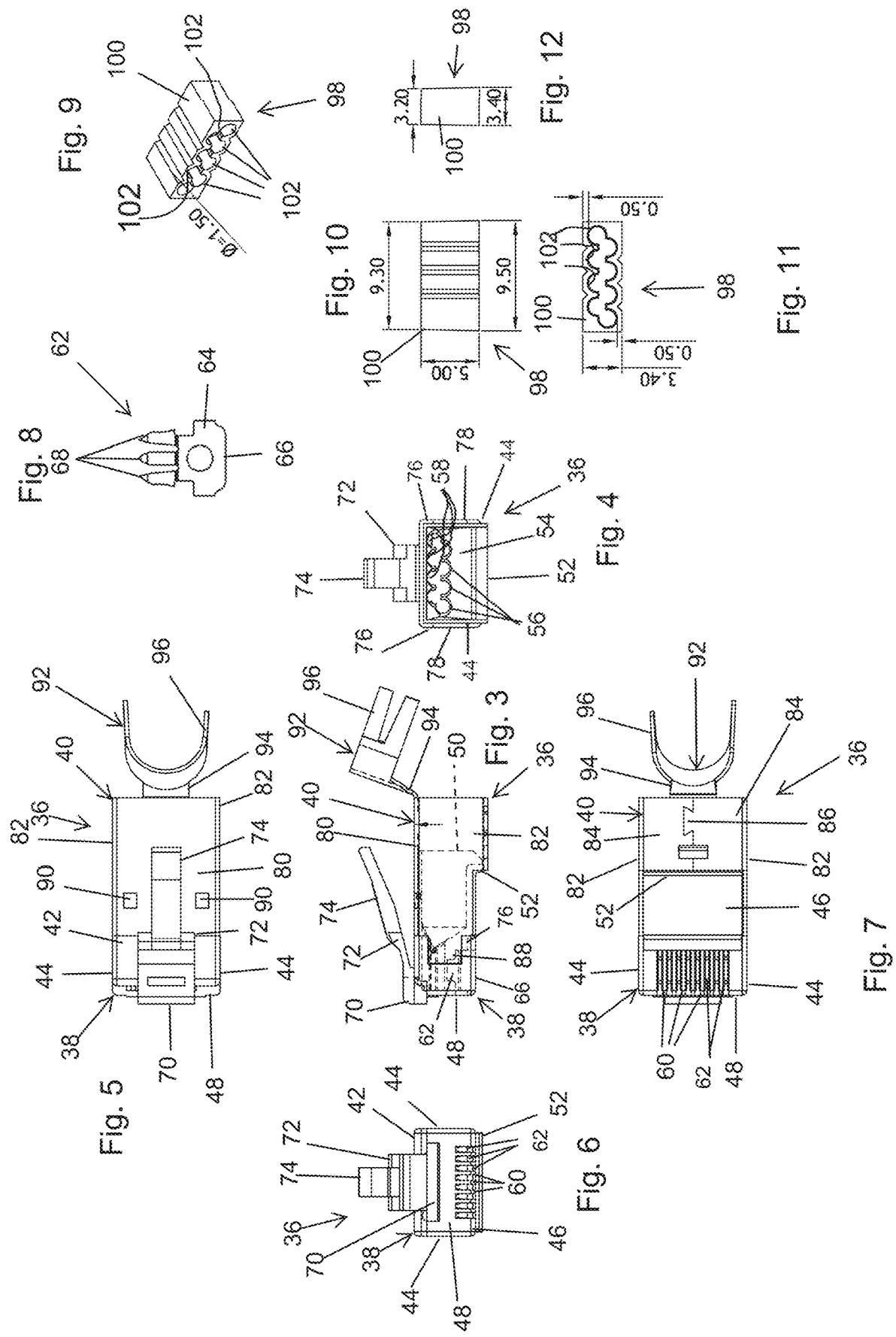

CABLE FOR POWER-OVER-ETHERNET HAVING AN EXTENDED USABLE LENGTH

RELATED APPLICATIONS

This application is a Continuation of U.S. patent application Ser. No. 17/385,225, filed, Jul. 26, 2021, which is a Continuation of U.S. patent application Ser. No. 16/653,271, filed Oct. 15, 2019 which issued as U.S. Pat. No. 11,107,605 on Aug. 31, 2021, which is a Continuation of U.S. patent application Ser. No. 15/080,936, filed Mar. 25, 2016 which issued as U.S. Pat. No. 10,453,589 on Oct. 22, 2019, which claims the benefit of U.S. Provisional Patent Application No. 62/138,575 filed on Mar. 26, 2015, the entire contents of which are incorporated herein by reference.

FIELD

The present disclosure is directed to electrical cable and more particularly to cable which simultaneously transmits power and data signals.

BACKGROUND OF THE INVENTION

Power-Over-Ethernet (POE) is about twenty years old and has been mainstream for about six or seven years. Among other things, it is used to power security cameras. It replaces coaxial cable for this purpose. You could also use fiber optic cable for this purpose but the use of fiber optic cable brings numerous complexities and attendant problems.

In POE cable electrical power is transmitted over the same twisted pair wires as the data signals. Typical POE cable is Category 5e or Category 6 (also known as Cat 5e or Cat 6) twisted pair cable. Cat 5e and Cat 6 are open specifications set by the Telecommunications Industry Association (TIA), an offshoot of the Electronic Industries Alliance (EIA). Cat 5e cable is always 24 gauge AWG (American wire gauge). Cat 6 is 23 or 24 gauge AWG.

Presently the maximum length of a POE cable having these specifications is 100 meters. Once you go beyond that length you have to add a booster or an intermediate distribution frame (IDF) that is powered off the grid. Users would like to extend that 100 meter distance without having to incorporate boosters or IDF's, which just add complexity and cost. The TIA publishes a document TSB-184A D4 for Guidelines for Supporting Power Over Balanced Twisted-Pair Cabling. It is noted that this document only is applicable to mid-span power, which requires that a POE injector with a power supply be installed in a tamper-proof cabinet every 328 feet. This increases the cost of the installation and also adds potential points of failure to a video surveillance system. The end-to-end POE power supply approach of the present disclosure only requires that power be supplied on one end of the system.

SUMMARY OF THE INVENTION

In one aspect, the present disclosure concerns a twisted pair cable with a particular gauge, insulation type and connector that permits extending the usable length of power-over-ethernet cable. The cable of the invention has a similar lay of twist as Cat 5e or Cat 6 cable. The twist is necessary to avoid cross-talk. The invention uses 20 AWG solid copper conductors in four twisted pairs. In one embodiment each conductor has FEP (fluorinated ethylene propylene) insulation and an overall FEP jacket. The insulation thickness is 0.012 inches. The connector is an RJ-45 style connector having an insert with holes that can accommodate the conductor and insulation of 20 AWG wires. This cable has successfully performed with video cameras, and no IDF's or boosters, at lengths of at least 292 meters with full resolution 1080p video at 30 fps using the RJ-45 connectors described herein. This is almost three times the distance standard category 5 or 6 cables can traverse without boosters or IDF's.

An alternate embodiment utilizes 22 AWG conductors with conventional RJ-45 connectors. The reach of this system is more than twice that of the mid-span approach.

BRIEF DESCRIPTION OF THE DRAWINGS

FIG. 2 is a cross-section of the cable of FIG. 1.

FIG. 3 is a side elevation view of a connector used with the cable of the present disclosure.

FIG. 4 is an end elevation view of the rear end of the connector of FIG. 3, with the shield removed to show only the housing.

FIG. 5 is a top plan view of the connector of FIG. 3.

FIG. 6 is an end elevation view of the front end of the connector of FIG. 3.

FIG. 7 is a bottom plan view of the connector of FIG. 3.

FIG. 8 is a side elevation view of a contact blade, on an enlarged scale.

FIG. 9 is a perspective view of the insert block used in the connector of FIG. 3.

FIG. 10 is a top plan view of the insert block of FIG. 9.

FIG. 11 is an end elevation view of the insert block.

FIG. 12 is a side elevation view of the insert block.

DETAILED DESCRIPTION

Figure 1:
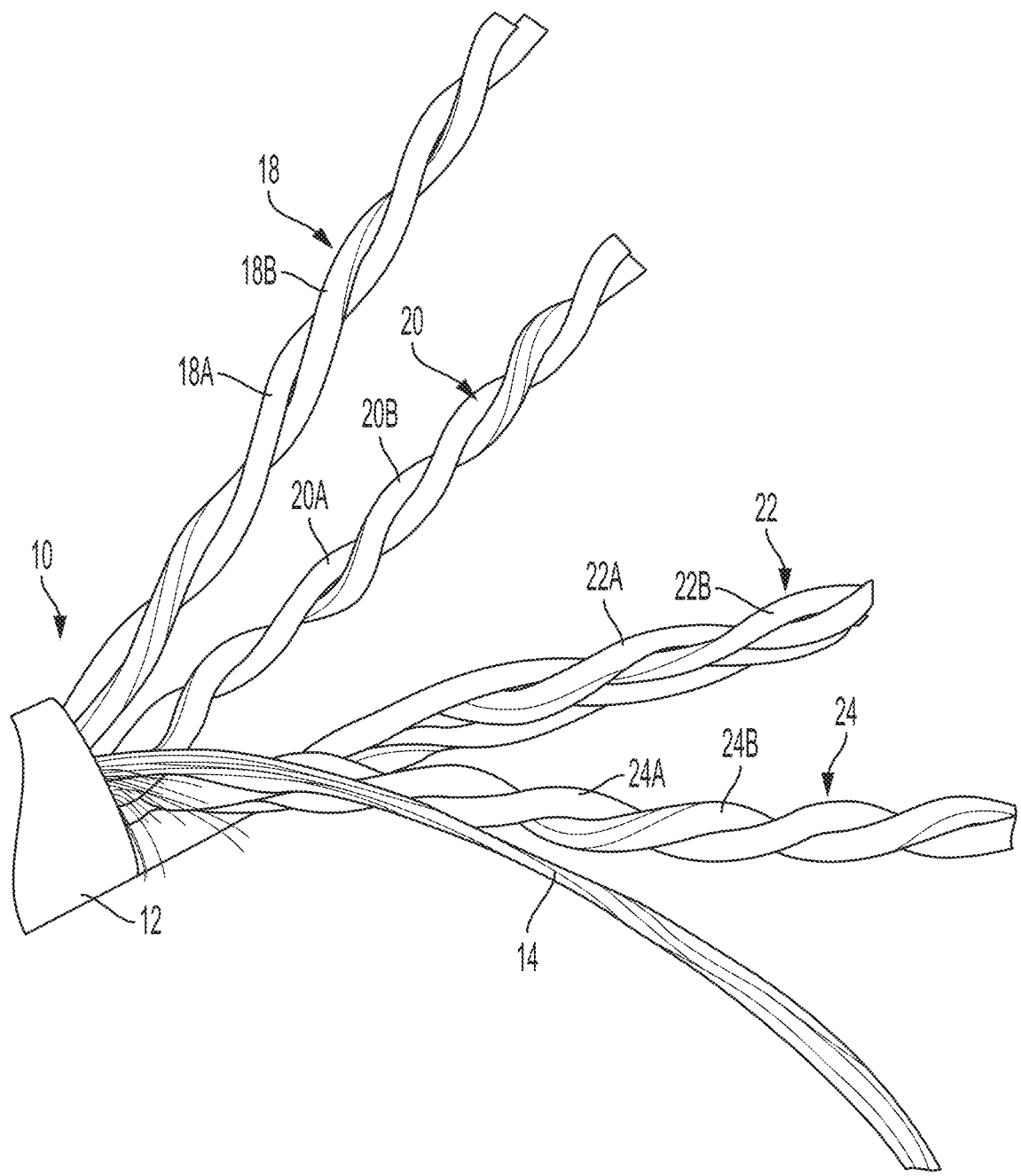
FIG. 1 is a perspective view of one embodiment of the cable with an end of the jacket removed to show the four twisted pairs of wires and a ripcord.

The present disclosure is directed to a cable for power-over-ethernet (POE) applications. The disclosure particularly concerns a method of extending the usable length of POE cables. An end portion of one embodiment of the cable is shown generally at 10 in FIG. 1. This embodiment is identified in the table below as UTP 20 AWG Cat6 CMP or CL3P. The cable includes an outer jacket 12 which in this embodiment is made of fluorinated ethylene propylene (FEP). The jacket has a wall thickness of about 0.013" and a diameter of about 0.248". The color may vary but an example is translucent blue. Preferably a ripcord 14 is included, although it is not required. A jacket this size has a weight of about 53 lbs/Mft.

The jacket 12 surrounds four twisted pairs of wires as seen at 18, 20, 22, 24. Each pair has two individual wires as shown by the designations A and B. Color codes may vary but, for example, pair 18 could be green x white/green, pair 20 could be brown x white/brown, pair 22 could be blue x white/blue, and pair 24 could be orange x white/orange. The pair lay length could be 1.40" LHL (8.57 Tw/Ft) (each pair staggered lay length). The cable lay length could be 5.00" LHL (2.40 Tw/Ft)

FIG. 2 shows a cross section of the cable of FIG. 1. In FIG. 2 the twisted pairs 18-24 are indicated diagrammatically by the circles. Each wire has a central conductor (one of which is shown at 32) which is 20 AWG solid annealed bare copper. The insulation (one of which is shown at 34) surrounding the conductor in this embodiment is fluorinated ethylene propylene (FEP) having a wall thickness of 0.012".

The electrical characteristics of the cable include an impedance of 98.80 Ω/Mft±10%, a capacitance of 15.0 pF/ft±10% and a DC resistance of 10.3 Ω/Mft @ 20° C. The cable is UL listed as type CL3P per UL standard 13 and as type CMP c(UL)us 200° C. FT-6 per UL standard 444. All materials used in the manufacture of this cable are RoHS II & REACH Compliant. The maximum operating voltage is 300V.

The cable as described delivers a greater distance while still being able to use connectors whose exterior dimensions are the same as standard RJ-45 connectors but whose interior is adapted to accept 20 AWG conductors.

In alternate embodiments polypropylene or PVC insulation could be used that will provide similar results. This will enable cables which are appropriate for all types of installations at a cost commensurate with the physical demands on the cables. That is, the first embodiment as in FIGS. 1 and 2 with FEP insulation is for plenum-rated cable which can be installed in air ducts and plenum spaces. An alternate embodiment will be cable which will not be plenum-rated but may still be run exposed in any other case and which may penetrate floors in a multi-level dwelling or commercial environment. The low-smoke, zero-halogen product is aimed at customers with a concern regarding the use of PVC and/or in enclosed spaces where the use of halogens as flame retardants could be hazardous. FEP which is used in the plenum-rated product is the highest cost compound that results in the most expensive cable. The other two embodiments will have lower costs as the compounds are about $1/7^{th}$ to $1/10^{th}$ the cost of FEP. The following table shows exemplary embodiments which have been found to be successful, although it will be understood that additional embodiments are possible.

The connector used with the cable of the present disclosure has an enlarged inner diameter of the RJ-45 front side to allow 20 AWG conductors to slide underneath the gold contact prongs. The gold prongs need to accommodate the 20 AWG size and the rear side has a metal clamp to hold the jacket (7.0 mm OD). The outside dimensions of the RJ-45 plug and boot are identical to the size of a regular RJ-45 patch cord, therefore the patch cord can plug into the regular patch panel and/or other connected devices, such as a security camera. Further details of the connector are shown and described below.

Tests on the new 20 AWG cable connected to a video camera showed that the cable worked up to 960 feet with a 1920×1080 high-resolution picture, whereas conventional Cat 6 cable worked only to 650 feet and the conventional Cat 5e worked to only 600 feet. This is over a 45% improvement in reach and the cable met all TIA electrical requirements for Cat 5e performance to 100 MHz and extrapolated to 350 MHz.

With 960 feet of usable length the present cable can extend 292 meters, which is almost three times the 100 meter distance for convention category cables. It is also possible that the FEP and polyethylene versions may be a little better in reach due to the different dissipation factor between FEP and PE insulation.

Some comments are noted here. First, this cable has an advantage since in addition to carrying video and power it also complies with TIA electrical performance requirements for Cat 5e. Second, it is possible to include a spline separator which will minimize cross-talk. Third, CCTV is a good application for the type of cable of the present invention, since the reach is almost tripled. Fourth, when TIA standards were written 100 meters was chosen as the test length of a typical installation, but allowed 300 meters for indoor multimode optical fiber. Fifth, security cameras are just one possible application of the present disclosure. Data centers, airport concourse signage and other very large commercial and government installations are examples of other applications which would benefit. There may also be a use for this cable in solar and wind power and control cables, so that one cable could support a typical installation, rather than requir-

| | All dimensions in millimeters | UTP 20 AWG Cat5E CMP | UTP 20 AWG Cat5E CM-LSZH | UTP 20AWG Cat5E CMR | UTP 20 AWG Cat6 CMP or CL3P |
|---|---|---|---|---|---|
| Conductor | Material | Solid annealed bare copper wire | Solid annealed bare copper wire | Solid annealed bare copper wire | Solid annealed bare copper wire |
| | Composing | 1/0.813 | 1/0.813 | 1/0.813 | 1/0.813 |
| | Diameter | 0.813 ± 0.01 | 0.813 ± 0.01 | 0.813 ± 0.01 | 0.813 ± 0.01 |
| Insulation | Material | FEP | HDPE | HDPE | FEP |
| | Wall thickness, nom | 0.2935 | 0.2935 | 0.2935 | 0.3048 |
| | Diameter | 1.40 ± 0.05 | 1.40 ± 0.05 | 1.40 ± 0.05 | |
| Twisted Pair | Lay length | ≤38 | ≤38 | ≤38 | ≤38 |
| | Diameter | 2.80 | 2.80 | 2.80 | |
| Cable Core | Composing | 4 twisted pairs stranded together | 4 twisted pairs stranded together | 4 twisted pairs stranded together | 4 twisted pairs stranded together |
| | Lay length | ≤120 | ≤120 | ≤120 | ≤127 |
| | Diameter | 5.2 ± 0.5 | 5.2 ± 0.5 | 5.2 ± 0.51 | |
| Sheath | Material | FR-PVC | CM-LSZH | FR-PVC | FEP |
| | Rip cord | Present under the sheath | Present under the sheath | Present under the sheath | Present under the sheath |
| | Wall thickness | 0.50 | 0.50 | 0.50 | 0.33 |
| | Diameter | 6.6 ± 0.5 | 6.6 ± 0.5 | 6.6 ± 0.5 | 6.3 |
| Electrical Performance at 20° C. | Conductor resistance | ≤9.38 Ω/100 m | ≤9.38 Ω/100 m | ≤9.38 Ω/100 m | 10.3 Ω/Mft ± 10% |
| | Insulation/resistance | ≥5000 MΩKm(DC 500 V Charged 1 Min) | ≥5000 MΩKm(DC 500 V Charged 1 Min) | ≥5000 MΩKm(DC 500 V Charged 1 Min) | |
| | Voltage endurance | DC 1500 V/min | DC 1500 V/min | DC 1500 V/min | |
| | Mutual capacitance | ≤7.0 nF/100 m | ≤7.0 nF/100 m | ≤7.0 nF/100 m | 15.0 pF/ft ± 10% |
| | Core-core resistance unbalance | ≤5% | ≤5% | ≤5% | | ing a bundle of cables. The cable may also extend VOIP distances and network distances by the same lengths as CCTV without the need for IDF equipment or closets.

FIGS. 3-7 illustrate an RJ-45 style connector 36 used with the cable of the present disclosure. It has a two-part shell including a housing 38 and a shield 40. The housing is made of a suitable plastic material, such as polycarbonate. The housing is a generally five-sided enclosure having a top wall 42, side walls 44, a bottom wall 46 and a front end wall 48. There is no end wall at the rear edges 50 of the side walls 44, thereby leaving the housing open for receiving an insert as described below. The side walls 44 are joined near their rear edges 50 by a transverse lip 52 that extends downwardly from the bottom wall 46.

The lip 52 leads into the interior of the housing which includes an angled ramp 54 extending upwardly from the bottom wall 46. At the top of the ramp are four semi-cylindrical conductor supports 56, as best seen in FIG. 4. The supports 56 are offset from a facing set of four semi-cylindrical conductor guides 58 which extend downwardly from the top wall 42. The supports 56 and guides 58 define a diameter sufficient to receive 20 AWG wires. A diameter of about 1.50 mm has been found sufficient. The supports 56 and guides 58 are staggered or offset from one another to provide sufficient space for the large diameter wires used herein.

The centers of the supports and guides are each aligned with one of eight compartments which are defined by a set of seven partitions 60. The partitions are vertical plates located forwardly of the ramp 54 and inside the confines of the side walls 44 and front end wall 48. The front end of the housing has a window or opening at the front lower corner where the front end wall 48 meets the bottom wall 46. The partitions 60 extend into the window space to create eight compartments that each receive a contact blade 62.

Details of one of the contact blades 62 are seen in FIG. 8. The blades may be made of copper alloy plated with a 50 µ-inch layer of gold over a 100 µ-inch underplate of nickel in the contact area. The contact blade 62 is an insulation displacement type blade that has a body 64 which defines a rail 66. A plurality of prongs 68 extend upwardly from the body 64. Four of the blades have prongs of extra length to reach the upper row of wires. With the blades 62 installed in the compartments of the connector housing the rails 66 are exposed at the window where they are engageable with a crimping tool during installation of the connector on a cable. After insertion of the wires and their associated insert into the housing, the wires are located in the spaces of the supports 56 and guides 58 and above the prongs of the blades 62. Then the blades are crimped such that the prongs 68 are forced upwardly into and through the insulation of the wires and into engagement with the conductors of the wires.

Exterior features of the connector 36 include a block 70 formed at the corner where the top wall 42 meets the front end wall 48. A latch 72 is cantilevered from the block 70. The latch 72 is flexible and engageable in the usual manner with an RJ-45 receptacle to releasably retain the connector 36 in the receptacle. A release lever 74 attached to and extending from the latch can be depressed to allow the latch to escape the receptacle and permit withdrawal of the connector therefrom.

The side walls 44 at their front ends have protrusions 76 (FIGS. 3 and 4) of slightly increased thickness compared to the remainder of the side wall. A rectangular hiatus in this increased thickness portion defines a depression 78 in the outer surface of the side wall, as best seen in FIG. 4. The depression receives an extension of the shield 40 as will be explained below.

Details of the shield 40 will now be described. The shield is preferably made of metal, such as a copper alloy. It is a stamped or otherwise formed sheet that is folded into a four-sided enclosure having a roof 80 joined to a pair of side panels 82 which in turn have a pair of bottom flaps 84. The bottom flaps are connected to one another at a dovetail joint 86 (FIG. 7). The side panels include a rectangular extension 88 at the forward end. The extension 88 fits in the depression 78 formed in the outer surface of the side walls 44 of the housing. The thickness of the side panel is the same as the thickness of the protrusions 76. Thus, the outer surfaces of the side walls 44 and side panels 82 are coplanar with one another and present a smooth interface at their junction points.

The roof 80 of the shield 40 has two three-sided piercings that form a pair of tabs 90. The tabs are bent inwardly slightly to engage depressions in the top wall 42 of the housing and thereby retain the shield on the housing. The rear edge of the roof 80 carries a clamp 92 which includes a strap 94 and a stirrup 96. The clamp starts out upraised as shown in FIG. 3. After insertion of the wires the strap 94 gets folded down so the stirrup is placed around the insulation of the wires and then the stirrup 96 is crimped to fasten the wires to the housing and provide strain relief.

FIGS. 9-12 illustrate an insert 98 that is used to constrain the wires in the desired configuration prior to placing the insert in the housing 38. The insert has a block 100 through which two staggered rows or four holes 102 are formed. These holes are arrayed similarly to the supports 56 and guides 58 so they align therewith upon placement of the insert in the housing. The diameters defined by the holes are the same as for the supports and guides, namely 1.50 mm. It will be noted in FIG. 12 that the block 100 is tapered from height of 3.20 mm the front end to 3.40 mm at the back end. This assists with installation of the insert into the housing 38 of the connector 36.

In an alternate embodiment four twisted pairs of 22 AWG wires could be used. These wires are easier to bend and can be used with standard RF-45 connectors. The individual and very tight lay lengths are indicated shown below. The left-hand rotation is normally as shown, which is blue, orange, green and brown. The four twisted pairs are then twisted together in the bundle twist lay noted below, which is also a left-hand lay. Both the individual pairs and the four-pair bundle are twisted in the same left-hand direction and this slightly tightens the twist of the individual pairs. Both operations need to be performed very accurately. The pair lay length could be less than or equal to about 1.496". The cable lay length could be less than or equal to about 4.724". More specifically, the lay length of each pair is Blue: 0.5460"; Orange: 0.8996"; Green: 0.6929"; Brown: 0.8047". Further, the four pairs cabling lay length is 3.9370".

The compatible twist lays indicated result in electrical performance that is vastly superior to that of a Cat 5e cable. Minimizing the cross-talk (high frequency noise) allows the digital signals in the cable to travel two to three times the distance of a Cat 5e cable, which is restricted to 100 meters (328 ft). The unique twist-lay combination together with the 22 AWG conductors minimizes the DC resistance of the cable significantly. Thus, the signal travels a longer distance and is less susceptible to noise. Since this cable meets and vastly exceeds the electrical performance specified for Cat 5e cables by TIA, which is a very good reference point, the cable of the present disclosure is an especially suitable cable for digital video surveillance and other demanding applications which require longer cable lengths than those specified by TIA.

The following chart shows test results of the 20 AWG and 22 AWG cables of the present disclosure compared to 23 AWG and 24 AWG cables of the prior art. These tests were performed using an Intellinet 560542 Managed Switch together with three different brands of IP video cameras. Note the 20 AWG and 22 AWG cables of the present disclosure provide usable cable length increases ranging from at least 26% (for 22 AWG on the ACTi and Bosch cameras compared to 23 AWG) to 60% (for 20 AWG on the Axis camera compared to 24 AWG).

| Cable Size | Camera | Resolution | Frames/Sec. | Link | Setting | Cable Length Feet |
|---|---|---|---|---|---|---|
| 20 AWG | AXIS Q6045 PTZ | 1920 × 1080P | 30 | LAPTOP | MP OPTIMIZED | 960 |
| | BOSCH IP 5000 SMP BOX | 1440 × 1080P | 12 | LAPTOP | 1 MP OPTMEZED H264 | 900 |
| | ACTi D22FA 5 MP* | 1920 × 1080P | 5 | ACTi ENR-1000 DVR | Auto | 800 |
| 22 AWG | AXIS Q6045 PTZ | 1920 × 1080P | 30 | LAPTOP | MP OPTIMIZED | 875 |
| | BOSCH IP 5001 SMP BOX | 1440 × 1080P | 12 | LAPTOP | 1 MP OPTIMIZED H264 | 825 |
| | ACTi D22FA 5 MP | 1920 × 1080P | 5 | ACTi ENR-1000 DVR | Auto | 825 |
| 23 AWG (Cat 6) | AXIS Q6045 PTZ | 1920 × 1080P | 30 | LAPTOP | MP OPTIMIZED | 650 |
| 24 AWG (Cat 5e) | AXIS Q6045 PTZ | 1920 × 1080P | 30 | LAPTOP | MP OFTIMIZED | 600 |

*All using Intellinet 56054 Managed Switch set to 10 MP Managed except * is set to auto It should be understood that various changes and modifications to the presently preferred embodiments described herein will be apparent to those skilled in the art. Such changes and modification can be made without departing from the spirit and scope of the invention disclosed herein. For example, in addition to the jacket 12, ripcord 14 and twisted pairs 18-24, an alternate embodiment may include an optional separator, a shield layer, a tape layer and/or a drain wire, the latter of which would be located between the shield and tape layers. The shield layer may be made of aluminum foil and the tape layer may be polyester film, such as Mylar®.

The invention claimed is:

1. A method of use of Ethernet cable, the method comprising:
   providing a cable of greater than 100 meters, the cable including:
      a first end,
      a second end opposite the first,
      four twisted pairs of wires, the wires being 22 AWG conductors and extending between the first end and the second end,
      insulation surrounding each wire, and
      an outer jacket surrounding the four twisted pairs of wires; and
   simultaneously transmitting power and data signals between the first end of the cable and the second end of the cable over the same twisted pairs of wires of the cable to effect end-to-end Power over Ethernet over the length of the cable while meeting or exceeding the electrical performance specified for Cat 5e cables by the Telecommunications Industry Association (TIA) for such cable while simultaneously transmitting power and data signals between the first end of the cable and the second end of the cable; wherein
   the power and data signals are transmitted simultaneously over the entire length of the cable and without a powered booster or intermediate distribution frame in between the first end and the second end.

2. The method of claim 1, wherein transmitting power and data signals between the first and of the cable and the second end of the cable comprises transmitting power and data signals between first electrical equipment and second electrical equipment.

3. The method of claim 2, wherein the first electrical equipment and the second electrical equipment are arranged such that transmitting power and data signals between the first electrical equipment and second electrical equipment requires a cable longer than 100 meters.

4. The method of claim 2, wherein transmitting power and data signals between the first electrical equipment and the second electrical equipment comprises providing power and data signals via the provided cable and not any other cables.

5. The method of claim 2, further comprising connecting the first end of the cable to the first electrical equipment such that power and data signals are transferred to or from the first electrical equipment via the cable.

6. The method of claim 5, further comprising connecting the second end of the cable to the second electrical equipment such that power and data signals are transferred to or from the second electrical equipment via the cable.

7. The method of claim 5, wherein connecting the first end of the cable to the first electrical equipment comprises attaching an RJ-45 style connector coupled to the first end of the cable to the first electrical equipment.

8. The method of claim 2, wherein the second electrical equipment comprises CCTV equipment.

9. The method of claim 8, wherein the CCTV equipment comprises a video camera.

10. The method of claim 2, wherein the second electrical equipment comprises voice over internet protocol (VOIP) equipment.

11. The method of claim 2, further comprising operating the second electrical equipment using only power suppled from the first electrical equipment over the cable.

12. The method of claim 1, further comprising terminating the first end of the cable in an RJ-45 style connector.

13. The method of claim 12, further comprising terminating the second end of the cable in an RJ-45 style connector.

14. The method of claim 1, wherein the cable is at least 292 meters in length.

15. The method of claim 1, wherein simultaneously transmitting power and data signals between the first end of the cable and the second end of the cable over the same twisted pairs of wires of the cable comprises transmitting video data from the first end of the cable to the second end of the cable.

16. The method of claim 15, wherein the cable is between 100 meters and 825 feet long and wherein simultaneously transmitting power and data signals from the first end of the cable to the second end of the cable over the same twisted pairs of wires of the cable comprises transmitting video data having a resolution of at least 1440×1080P and a framerate of at least 12 frames per second.

17. The method of claim 15, wherein the cable is between 100 meters and 875 feet long and wherein simultaneously transmitting power and data signals from the first end of the cable to the second end of the cable over the same twisted pairs of wires of the cable comprises transmitting video data having a resolution of at least 1920×1080P and a framerate of at least 30 frames per second.

18. The method of claim 1, wherein the cable having four twisted pairs of wires comprises a cable lay length of less than or equal to about 4.724 inches.

19. The method of claim 18 wherein the cable having four twisted pairs of wires comprises first pair with a lay length of about 0.5460 inches, a second pair with a lay length of about 0.8996 inches, a third pair with a lay length of about 0.6929 inches and a fourth pair with a lay length of about 0.8047 inches.

20. The method of claim 19, wherein the cable further comprises a ripcord.

21. A method of use of Ethernet cable, the method comprising:
providing a cable of greater than 100 meters, the cable including:
a first end,
a second end opposite the first,
four twisted pairs of wires, the wires being 22 AWG conductors and extending between the first end and the second end,
insulation surrounding each wire, and
an outer jacket surrounding the four twisted pairs of wires; and
simultaneously transmitting power and data signals between the first end of the cable and the second end of the cable over the same twisted pairs of wires of the cable to effect end-to-end Power over Ethernet over the length of the cable while meeting or exceeding the electrical performance specified for Cat 6 cables by the Telecommunications Industry Association (TIA) for such cable while simultaneously transmitting power and data signals between the first end of the cable and the second end of the cable; wherein the power and data signals are transmitted simultaneously over the entire length of the cable and without a powered booster or intermediate distribution frame in between the first end and the second end.

22. A method of use of Ethernet cable, the method comprising:
providing a cable having a length of greater than 100 meters, the cable including:
a first end,
a second end opposite the first,
four twisted pairs of wires, the wires being 22 AWG conductors and extending between the first end and the second end,
insulation surrounding each wire, and
an outer jacket surrounding the four twisted pairs of wires; and
simultaneously transmitting power and data signals between the first end of the cable and the second end of the cable over the same twisted pairs of wires of the cable to effect end-to-end Power over Ethernet over the length of the cable and without a powered booster or intermediate distribution frame in between the first end and the second end.

23. The method of claim 22, wherein the simultaneously transmitting the power and data signals between the first end of the cable and the second end of the cable over the same twisted pairs of wires meets or exceeds the electrical performance specified for Cat 5e cables by the Telecommunications Industry Association (TIA) for such cable while simultaneously transmitting power and data signals between the first end of the cable and the second end of the cable.

24. The method of claim 23, wherein the simultaneously transmitting the power and data signals between the first end of the cable and the second end of the cable over the same twisted pairs of wires meets or exceeds the electrical performance specified for Cat 6 cables by the Telecommunications Industry Association (TIA) for such cable while simultaneously transmitting power and data signals between the first end of the cable and the second end of the cable.

25. The method of claim 22, wherein simultaneously transmitting power and data signals between the first end of the cable comprises providing sufficient power and throughput to operate an Axis Q6045 PTZ camera at 30 frames per second and 1920×1080P resolution.

26. The method of claim 22, wherein simultaneously transmitting power and data signals between the first end of the cable comprises providing sufficient power and throughput to operate a Bosch IP 5000 5 MP Box camera at 12 frames per second and 1440×1080P resolution.

27. The method of claim 22, wherein simultaneously transmitting power and data signals between the first end of the cable comprises providing sufficient power and throughput to operate an ACTi D22FA 5 MP camera at 5 frames per second and 1920×1080P resolution.

* * * * *